United States Patent [19]

Najjar et al.

[11] Patent Number: 4,851,151

[45] Date of Patent: Jul. 25, 1989

[54] PROCESS FOR PRODUCTION OF SYNTHESIS GAS WITH REDUCED SULFUR CONTENT

[75] Inventors: Mitri S. Najjar, Hopewell Junction; Roger J. Corbeels; Uygur Kokturk, both of Wappingers Falls, all of N.Y.

[73] Assignee: Texaco Inc., White Plains, N.Y.

[21] Appl. No.: 190,928

[22] Filed: May 6, 1988

[51] Int. Cl.$^4$ .............................. C01B 3/22; C01B 3/02
[52] U.S. Cl. .................................. 252/373; 48/197 R
[58] Field of Search ........................ 252/373; 48/197 R

[56] References Cited

U.S. PATENT DOCUMENTS 4,788,003  11/1988  Najjar et al. ......................... 252/373

*Primary Examiner*—Howard T. Mars
*Attorney, Agent, or Firm*—Robert A. Kulason; James J. O'Loughlin

[57] ABSTRACT

A process for the partial oxidation of a sulfur- and silicate-containing carbonaceous fuel to produce a synthesis gas with reduced sulfur content which comprises partially oxidizing said fuel at a temperature in the range of 1800°–2200° F. in the presence of a temperature moderator, an oxygen-containing gas and a sulfur capture additive which comprises an iron-containing compound portion and a sodium-containing compound portion to produce a synthesis gas comprising $H_2$ and CO with a reduced sulfur content and a molten slag which comprises (i) a sulfur-containing sodium-iron silicate phase and (ii) a sodium-iron sulfide phase. The sulfur capture additive may optionally comprise a copper-containing compound portion.

29 Claims, No Drawings

PROCESS FOR PRODUCTION OF SYNTHESIS GAS WITH REDUCED SULFUR CONTENT

The Government of the United States of America has rights in this invention pursuant to Contract No. DE-FC21-87MC23277 awarded by the U.S. Department of Energy.

BACKGROUND OF THE INVENTION

1. Field of the Invention

This invention relates to a process for the partial oxidation of a sulfur- and silicate-containing carbonaceous fuel to produce a synthesis gas with reduced sulfur content. More particularly, this invention relates to a process for the partial oxidation of a sulfur- and silicate-containing carbonaceous fuel in the presence of a temperature moderator, an oxygen-containing gas, and a sulfur capture additive which comprises an iron-containing compound portion, a sodium-containing compound portion, and an optional copper-containing compound portion to produce a synthesis gas with reduced sulfur content and a molten slag which comprises (i) a sulfur-containing sodium-iron silicate phase and (ii) a sodium-iron sulfide phase.

2. Information Disclosure Statement

It is well known by those skilled in the art that synthesis gas comprising primarily $H_2$ and CO, together with various amounts of other gases, may be produced via the partial oxidation gasification of a carbonaceous fuel at elevated temperatures. References disclosing such a process include coassigned U.S. Pat. Nos. 2,818,326 (Eastman et al.), 2,896,927 (Nagle et al.), 3,998,609 (Crouch et al.), and 4,218,423 (Robin et al.), all incorporated herein by reference. Such carbonaceous fuels include crude residue from petroleum distillation and cracking processes, petroleum distillates, reduced crudes, whole crudes, asphalts, washed and unwashed coals, coal tars, coal derived oils, petroleum cokes, shale oils, tar sand oils, and mixtures thereof. The production of synthesis gas from such fuels is described by, for example, coassigned U.S. Pat. Nos. 3,544,291 (Schlinger et al.), 3,976,442 (Paull et al.) and 3,996,026 (Cole), all incorporated herein by reference.

It would be highly desirable to use comparatively low cost and readily available sulfur- and silicate-containing solid carbonaceous fuels for the production of synthesis gas comprising $H_2$ and CO. However, in conventional partial oxidation gasification processes, sulfur-containing gases (e.g. $H_2S$ and COS) in the amount of about 0.1 to 2.0 mole % are produced along with the $H_2$ and CO. These sulfur-containing gaseous impurities are undesirable, as they are pollutants, corrode piping and equipment upon contact, and deactivate downstream catalysts. Accordingly, raw gas streams from the reaction zone may require additional downstream gas purification in order to remove the sulfur-containing gases prior to the use of the synthesis gas in chemicals production, power generation, and the like.

Conventional processes employed in the downstream removal of sulfur and sulfur compounds from synthesis gas (often called acid gas removal processes) are described, for example, in R. F. Probstein & R. E. Hicks, Synthetic Fuels (1982) at pp. 210-21, and include both liquid absorption and solid absorption techniques. Such techniques generally require that the synthesis gas first be cooled from its production temperature of 1500°-3000° F., say 1700°-2200° F. to a lower temperature prior to removal of sulfur and sulfur-containing compounds. It would thus be advantageous to remove or reduce the concentration of sulfur and sulfur-containing compounds in the synthesis gas during or immediately after the production of the synthesis gas, while it is at high temperatures (i.e. in-situ sulfur removal). This would improve the thermal efficiency of the synthesis gas production process and in addition reduce costs associated with gas cooling and purification equipment and maintenance. References describing high temperature gas desulfurization are as follows:

Co-assigned U.S. patent application Ser. No. 100,673, filed Sept. 24, 1987 (Najjar et al.) and incorporated herein by reference discloses a process for the simultaneous partial oxidation and desulfurization of a sulfur and silicate-containing solid carbonaceous fuel, the process comprising reacting the fuel and an iron-containing material in the presence of an oxygen-containing gas and a temperature moderator to produce synthesis gas and entrained molten slag in admixture with molten iron oxysulfide and the silicates of calcium and iron.

Co-assigned U.S. patent application Ser. No. 101,519, filed Sept. 28, 1987 (Suggitt et al.) and incorporated herein by reference discloses a process for the production of desulfurized synthesis gas from a sulfur-containing carbonaceous fuel, the process comprising: (a) reacting a first portion of the fuel with an oxygen-containing gas and a temperature moderator to produce a synthesis gas; and (b) passing a second portion of the fuel in admixture with a portion of the synthesis gas and an iron-containing additive to a second reactor and thereby reacting to produce additional $H_2$ and carbon oxides and particulate matter comprising iron oxysulfide derived from the interaction of the iron-containing additive and the sulfur-containing gases produced by partial oxidation of the fuel. In one embodiment of this invention, an alkali metal or alkali earth metal catalyst selected from Group IA or IIA of the Periodic Table of Elements is introduced into the second reactor in admixture with the fuel and iron-containing additive.

Co-assigned U.S. patent application Ser. No. 107,065, filed Oct. 13, 1987 (Najjar et al.) and incorporated herein by reference discloses a process for the production of desulfurized synthesis gas from a sulfur-containing carbonaceous fuel, the process comprising: (a) reacting a first portion of the fuel with an oxygen-containing gas and a temperature moderator to produce a synthesis gas; and (b) reacting a devolatized second portion of fuel and carbon from the unreacted first portion of fuel in a second reactor in the presence of a calcium-containing additive to produce additional $H_2$ and carbon oxides and to achieve in-situ conversion of sulfur-containing gases (e.g. $H_2S$, COS) into calcium sulfide. In one embodiment of this invention, an alkali metal or alkali earth metal catalyst selected from Group IA or IIA of the periodic table is introduced into the second reactor in admixture with the fuel and iron-containing additive.

U.S. Pat. No. 4,598,652 (Hepworth) discloses a process for combusting sulfur-containing coal to produce a fuel gas low in sulfur, the process comprising combusting sulfur-containing particulate coal in the presence of a finely divided sulfur-fixing material from the group consisting of iron oxide, iron powder and copper oxide to form an essentially sulfur-free fuel gas and the liquid oxysulfide slag containing essentially all the sulfur originally contained in the coal.

U.S. Pat. No. 4,599,955 (Hepworth et al.) discloses a process for combusting a sulfur-containing coal to produce a fuel gas low in sulfur and a slag containing the ash and sulfur content of the coal, the process comprising combusting the coal in a cyclone furnace under strongly reducing conditions in the presence of a sulfur fixing agent selected from the group consisting of lime, limestone and dolomite.

U.S. Pat. No. 4,572,085 (Hepworth) discloses a process for combusting a sulfur-containing coal to produce a fuel gas low in sulfur and a slag containing the ash and sulfur content of the coal, the process comprising combusting the coal in a burner cavity (e.g. a cyclone furnace) in the presence of a finely divided iron-containing material from the group consisting of iron oxide and iron powder to produce an essentially sulfur-free fuel gas and a liquid iron oxysulfide slag containing essentially all the sulfur originally contained in the coal.

SUMMARY OF THE INVENTION

The instant invention is a process for the partial oxidation of a sulfur- and silicate-containing carbonaceous fuel, preferably coal, to produce a synthesis gas with a reduced sulfur content. The process comprises partially oxidizing the fuel at a temperature in the range of 1800°–2200° F., preferably 1800°–2100° F. in the presence of a temperature moderator, an oxygen-containing gas, and a sulfur capture additive which comprises an iron-containing compound portion present in a concentration of 0.1–15.0, preferably 4.0–8.0 weight percent (based on the weight of the carbonaceous fuel) and a sodium-containing compound portion present in a concentration of 0.1–5.0, preferably 1.0–3.0 weight percent (based on the weight of the carbonaceous fuel). The sulfur capture additive may also optionally comprise a copper-containing compound portion present in a concentration of less than 5.0, preferably 0.5–2.0 weight percent (based on the weight of the carbonaceous fuel).

The partial oxidation of the fuel in the presence of the sulfur capture additive produces a synthesis gas comprising $H_2$ and CO with a reduced sulfur content and a molten slag which comprises a sulfur-containing sodium silicate phase and an iron oxysulfide phase. The process of the instant invention is advantageous in that it produces a synthesis gas with reduced sulfur content, thereby eliminating or reducing the need for cooling or further downstream treatment of the synthesis gas for sulfur removal prior to use and in addition it produces a molten slag comprising (i) a sulfur-containing sodium-iron silicate phase and (ii) a sodium-iron sulfide phase, the slag freely flowing from the partial oxidation reactor, thereby improving reactor operation and facilitating slag disposal.

DESCRIPTION OF THE PREFERRED EMBODIMENTS

It is the object of this invention to provide a process for the partial oxidation of a sulfur- and silicate-containing carbonaceous fuel to produce a synthesis gas comprising $H_2$ and CO and having a reduced sulfur content for downstream use and a molten slag which flows easily from the partial oxidation reactor.

It is one feature of the process of this invention that a sulfur- and silicate-containing carbonaceous fuel is partially oxidized at a temperature of 1800°–2200° F. in the presence of a temperature moderator, an oxygen-containing gas, and a sulfur capture additive which comprises an iron-containing compound portion and a sodium-containing compound portion to produce a synthesis gas with reduced sulfur content and a molten slag which comprises (i) a sulfur-containing sodium-iron silicate phase and (ii) a sodium-iron sulfide phase. It is another feature of this invention that a sulfur- and silicate-containing carbonaceous fuel is partially oxidized at a temperature of 1800°–2200° F. in the presence of a temperature moderator, an oxygen-containing gas, and a sulfur capture additive which comprises an iron-containing compound portion, a sodium-containing compound portion, and a copper-containing compound portion to produce a synthesis gas with reduced sulfur content and a molten slag which comprises (i) a sulfur-containing sodium-iron silicate phase and (ii) a sodium-iron sulfide phase.

The process of the instant invention is advantageous in that it provides a process for the partial oxidation of a sulfur- and silicate-containing carbonaceous fuel which produces a synthesis gas with reduced sulfur content, thereby eliminating or reducing the need for cooling or further downstream treatment of the synthesis gas for sulfur removal prior to use. The process of the instant invention is also advantageous in that it produces a molten slag comprising (i) a sulfur-richer sodium-iron silicate phase and (ii) a sodium-iron or sodium-copper-iron sulfide phase. The slag freely flows from the partial oxidation reactor, thereby improving reactor operation and facilitating disposal of the slag.

The sulfur- and silicate-containing carbonaceous fuel which may be employed in the process of this invention is typically solid at ambient temperatures and contains ash. The fuel may be selected from the group consisting of unwashed or washed coal (including anthracite, bituminous, sub-bituminous, and lignite), crude residue from petroleum distillate, reduced crude, whole crude, asphalt coal, coal tar, coal derived oil, petroleum coke, shale oil, tar sand oil, and mixtures thereof. Such fuels ordinarily contain varying amounts of silicate, sulfur and sulfur compounds, as well as metal and metal compounds. The metals include vanadium, nickel, and iron. Typically, these fuels may contain ash in amounts as little as 0.1 wt.%–0.5 wt.% or as much as 20 wt.%–40 wt.%. They may also contain water in amounts as low as 0 wt.%–10 wt.% or as much as 30 wt.%–40 wt.% or more. Although the fuel may be used without reducing the moisture content, it is preferred, to facilitate grinding and slurrying in the case of those fuels containing large amounts of water, to pre-dry the fuel to a moisture content to 2 wt.%–20 wt.% depending on the nature of the fuel. The fuel may be ground to a particle size so that preferably 100 wt.% passes through a 14 mesh sieve and greater than 50 wt.% has a particle size within the range of 14–325 mesh sieve.

In the case of some pitches, asphalts, and tar sand, it may be possible to feed them as liquids by heating them to just below their decomposition temperature. A ground solid fuel alone may be employed as charge; by preferably the ground solid fuel is slurried in a liquid vaporizable hydrocarbon or water, or it is entrained in a gaseous medium. The fuel may be slurried with water, a liquid hydrocarbon fuel, liquid $CO_2$ or mixtures thereof. The preferred slurrying agent is water, and it is preferably present in the charge to gasification in amount of 30–120 parts per 100 parts of solid coal or petroleum coke. In typical operations, the fuel is slurried with the slurrying agent in a slurry preparation tank, where the slurry is prepared to the desired concentration, and thereafter pumped to the partial oxidation reactor by means of a slurry feed pump. Alternatively, the fuel may be entrained in a gas such as steam, carbon dioxide, nitrogen, recycle synthesis gas, air, etc. When the fuel is a liquid or a gas, no slurrying liquid is admitted with the charge fuel.

Typical liquid hydrocarbon charge fuel which may be employed include various oils derived from petroleum including distillates and residues such as crude petroleum, reduced crude, gas oil, cycle gas oil, coker gas oil, furfural extract of coker gas oil, etc; oil derived from coal, tar sands, lignite, etc. Such liquids may be employed in the form of a slurry which includes 100 parts of solid coal or coke with 40–150 parts, preferably 50–100 parts, say 55–60 parts of liquid. Gaseous hydrocarbon charge fuels may also be employed.

The slurrying agent or entraining gas employed may also act as a temperature moderator for the partial oxidation reaction. If desired, there can also be charged a supplemental temperature moderator to moderate the temperature in the reaction zone. Moderators may be necessary when the charge includes liquid vaporizable hydrocarbons in order to simultaneously achieve desired conversion level (optimum efficiency) and temperature (fixed by materials of construction). When employed, they may be admitted with any of the charge streams or separately. Typical temperature moderators may include superheated steam, saturated steam, carbon dioxide-rich gas, cooled exhaust from downstream turbines, nitrogen-in-air, by-product nitrogen from a conventional air separation unit, etc.

The charge to the partial oxidation reactor also includes an oxygen-containing gas. Typical of such gases which contain at least about 21 wt.% oxygen include air, oxygen-enriched air (containing more than 21 wt.% oxygen), substantially pure (e.g. greater than 95 wt.%) oxygen, etc. Commonly, the oxygen-containing gas contains oxygen plus other gases derived from the air from which the oxygen was prepared. The atomic ratio of oxygen (in the oxygen-containing gas) to carbon (in the fuel) may be 0.6–1.2. When the oxygen-containing gas is substantially pure oxygen, the ratio may be 0.7–1.2, preferably 0.9–1.0. When it is air, the ratio may be 0.8–1.2, say 1.2. When water is employed as the temperature moderator, the weight ratio of water to carbon in the fuel may be 0–2.0, preferably 0.2–0.6, say 0.5. In all of the above cases, the atomic ratio of oxygen to carbon is such that less than 60% of the oxygen stoichiometrically required for coal combustion is supplied in the process of the instant invention.

The charge to the partial oxidation reactor additionally comprises a sulfur capture additive which comprises an iron-containing compound portion and a sodium-containing compound portion, and may additionally comprise a copper-containing compound portion. The iron-containing compound portion is preferably selected from the group consisting of iron oxides, iron carbonates, iron ores, mill scale and mixtures thereof. Iron oxides and mill scale are particularly preferred for use as the iron-containing compound portion of the sulfur capture additive.

The sodium-containing compound portion of the sulfur capture additive is preferably selected from the group consisting of sodium oxides, sodium carbonates, organic sodium-containing compounds, sodium silicates, sodium aluminum silicates and mixtures thereof. Sodium carbonates are particularly preferred for use as the sodium-containing compound portion of the sulfur capture additive.

The optional copper-containing compound portion of the sulfur capture additive, if employed, is selected from the group consisting of copper oxides, copper carbonates, copper-containing ores, and mixtures thereof. Copper oxides are particularly preferred for use as the optional copper-containing compound portion of the sulfur capture additive.

In the process of the instant invention, the sulfur- and silicate-containing carbonaceous fuel is partially oxidized in the presence of a temperature moderator, an oxygen-containing gas, and the abovedescribed sulfur capture additive. In a preferred embodiment of the instant invention, the sulfur capture additive is mixed with the fuel prior to the fuel being charged into the partial oxidation reactor. If the fuel is slurried with water as previously described, the sulfur capture additive may first be ground together or separately with the fuel to a particle size of 0.1–2000 microns and then admixed with the fuel-water slurry prior to introduction to the partial oxidation reactor. The sulfur capture additive comprises 1.0–15.0, preferably 4.0–8.0 weight percent of iron-containing compound portion and 0.1–5.0, preferably 1.0–3.0 weight percent sodium-containing compound portion. If the optional copper-containing compound portion is employed, it is employed at a concentration of less than 5.0, preferably 0.5–2.0 weight percent. All of the abovedescribed weight percents are based on the weight of the solid carbonaceous fuel.

The sulfur- and silicate-containing carbonaceous fuel in admixture with the abovedescribed sulfur capture additive is introduced, together with oxygen-containing gas and temperature moderator (which may be the slurrying medium for the fuel, e.g., water) into a partial oxidation synthesis gas generator, typified by that set forth in coassigned U.S. Pat. No. 2,818,216 (Eastman et al.). This generator includes an annulus-type burner (such as is typified by that set forth in coassigned U.S. Pat. Nos. 2,928,460, (Eastman et al.) 4,328,006 (Muenger et al.) or 4,328,008 (Muenger et al.) in a vertical cylindrical steel pressure vessel lined with a thermal refractory material.

The partial oxidation reaction takes place in the reaction zone of the gas generator at a temperature in the range of 1800°–2200° F., preferably 1800°–2100° F. and a pressure of 2–250 atmospheres, say 10–100 atmospheres. The oxygen-containing gas and temperature moderator are provided in a controlled amount so that an equilibrium oxygen concentration is provided in the gas phase in the reaction zone having a partial pressure which is less than about $10^{-14}$ atmospheres.

The partial oxidation of the sulfur- and silicate-containing carbonaceous fuel in the presence of a temperature moderator, an oxygen-containing gas and the abovedescribed sulfur capture additive produces a synthesis gas with the following approximate concentrations:

| Component | Mole % |
|---|---|
| $H_2$ | 8–60 |
| CO | 8–70 |
| $CO_2$ | 1–20 |
| $H_2O$ | 1–40 |
| $CH_4$ | 0–30 |
| $H_2S+COS$ | $\leq 0.6$ |
| $N_2$ | 0–85 |
| $NH_3$ | 0–2.0 |

The gas may be cooled and otherwise further treated via conventional means prior to use for power generation, chemicals production, and the like.

In addition, a molten slag which comprises (i) a sulfur-containing sodium-iron silicate phase and (ii) a sodium-iron sulfide phase is produced by the process of the instant invention. By definition, molten slag is the molten remnant of particles of the solid carbonaceous fuel which have been subjected to partial oxidation in the process of the instant invention. The sodium-iron silicate slag phase comprises the reaction products of the sodium-containing compound component of the sulfur capture additive, silicate material of the original carbonaceous fuel, 5–50% of the iron-containing compound component of the sulfur capture additive, and captured sulfur compounds. The sodium-iron sulfide slag phase comprises the reaction products of the iron-containing compound and sodium-containing compound components of the sulfur capture additive and captured sulfur compounds. This phase is essentially a solution of iron sulfide and sodium sulfide which contains lesser amounts, say less than 1.0 wt.% at 2200° F., of oxygen as compared with a typical iron oxysulfide produced from an iron-containing sulfur capture additive alone which contains say 3.0–6.0 wt.% oxygen at 2200° F. Increased sulfur concentration in each phase represents enhanced sulfur capture from the synthesis gas during partial oxidation, with attendant advantages as previously described.

Molten slag typically accumulates on the vertical walls of the partial oxidation reactor, and ideally flows freely out of the reactor via the outlet located at the bottom of the reaction zone. However, incomplete melting of the ash often causes the viscosity of the slag to increase, resulting in the accumulation of slag, together with its metal constituents, on the walls and refractory of the gasification reactor. This accumulation of slag often leads to reactor operability problems as well as potential damage to the reactor refractory.

The process of the instant invention is advantageous over other processes which employ only an iron-containing sulfur capture agent in that the presence of the sodium-containing component of the sulfur capture additive is necessary for the formation of the abovedescribed sodium-iron sulfide and sodium-iron silicate slag phases. The solubility of sulfur in the sodium-iron sulfide slag phase produced by the process of the instant invention is enhanced as compared with a typical iron oxysulfide slag phase which is produced by processes which employ an iron-containing sulfur capture additive without the presence of a sodium-containing component.

The enhanced sulfur solubility of the sodium-iron sulfide phase (as produced by the process of the instant invention) over the sulfur solubility of an iron oxysulfide phase (produced by use of a sulfur capture additive comprising only iron compounds) is illustrated by Table I, below.

TABLE I

| Temperature (°F.) | Sulfur/Iron Atomic Ratio in Na—Fe Sulfide Phase (Instant Invention) | Sulfur/Iron Atomic Ratio in Fe—oxysulfide Phase (Fe Additive only) |
| --- | --- | --- |
| 1800 | 0.89–0.92 | 0.86–0.94 |
| 2200 | 0.94–1.06 | 0.72 |

As depicted in Table I, sulfur/iron atomic ratios in the sodium-iron sulfide phase produced by the process of the instant invention and in the iron oxysulfide phase typical of that produced via use of a sulfur capture additive comprising only iron compounds were measured at 1800° F. and 2200° F. The sulfur/iron atomic ratio is indicative of sulfur capture by the sodium-iron sulfide and iron-oxysulfide phases, respectively. At a temperature of 1800° F., the sulfur/iron atomic ratios for the sodium-iron sulfide and iron-oxysulfide phases were approximately equivalent, thus indicating approximately equivalent levels of sulfur solubility and concurrent sulfur capture in each of the phases. However, at 2200° F. the sulfur/iron atomic ratio in the sodium-iron sulfide phase was considerably higher than the corresponding value for the sulfur/iron atomic ratio in the iron oxysulfide phase, thus indicating improved levels of sulfur solubility and concurrent sulfur capture in the sodium-iron sulfide phase at temperatures between 1800° and 2200° F. Since most of the sulfur capture achieved via the process of the instant invention takes place in the sodium-iron sulfide phase, the above results for sulfur capture in the sodium-iron sulfide phase are indicative of overall sulfur capture for the process of the instant invention. It is estimated that the presence of sodium in the sodium-iron sulfide phase produces a total increase in sulfide phase sulfur capture of about 8%–20% greater than sulfur capture achieved in an iron oxysulfide phase where no sodium is present.

The process of the instant invention is additionally advantageous in terms of sulfur capture over other processes which employ only an iron-containing sulfur capture agent in that the sodium-iron silicate phase produced is fluid at a lower temperature than a corresponding iron silicate phase. This greater fluidity allows the partial oxidation reactor to be operated at a lower temperature without attendant slag plugging problems. Concurrently, the operation at lower temperatures facilitates greater capture of sulfur based upon thermodynamics. It is estimated that the presence of sodium in the silicate phase due to the sodium-containing sulfur capture additive component produces a total increase in sulfur capture in the silicate phase of about 5–10% greater than sulfur capture achieved in an iron silicate phase where no sodium is present.

The flow of slag from the partial oxidation reactor is facilitated by the use of the iron- and sodium-containing sulfur capture additive of the instant invention. However, invariably some metallic iron will be contained in the molten slag. Metallic iron may cause plugging problems in the outlet of the reactor due to higher slag viscosities. To alleviate this potential problem, less than 5.0, preferably 0.5–2.0 weight percent (based on the weight of fuel) of the abovedescribed copper-containing compound may optionally be employed to increase the fluidity of the metallic iron within the slag. The amount of copper-containing compound to be employed is determined from the amount of metallic iron formation in the system, which is in turn a function of oxygen partial pressure in the system.

It is a critical feature of the process of the instant invention that the partial oxidation reactor be operated at temperatures of 1800°–2200° F., preferably 1800°–2100° F. to achieve optimum sulfur capture from the synthesis gas to the sodium-iron silicate and sodium-iron sulfide phases. At temperatures above 2200° F. sulfur capture is substantially diminished. At temperatures below 1800° F., slag fluidity is diminished and plugging and other operational problems will arise.

It will be evident that the terms and expressions employed herein are used as terms of description and not of limitation. There is no intention, in the use of these descriptive terms and expressions, of excluding equivalents of the features described and it is recognized that various modifications are possible within the scope of the invention claimed.

The invention claimed is:

1. A process for the partial oxidation of a sulfur- and silicate-containing carbonaceous fuel to produce a synthesis gas with reduced sulfur content which comprises partially oxidizing said fuel at a temperature in the range of 1800°–2200° F. in the presence of a temperature moderator, an oxygen-containing gas and a sulfur capture additive which comprises an iron-containing compound portion and a sodium-containing compound portion to produce a synthesis gas comprising $H_2$ and CO with a reduced sulfur content and a molten slag which comprises a sulfur-containing sodium-iron silicate phase and a sodium-iron sulfide phase.

2. A process according to claim 1, where said sulfur- and silicate-containing carbonaceous fuel is selected from the group consisting of unwashed or washed coal, crude residue from petroleum distillation and cracking process operations, petroleum distillate, reduced crude, whole crude, asphalt coal, coal tar, coal derived oil, petroleum coke, shale oil, tar sand oil, and mixtures thereof.

3. A process according to claim 1, where said sulfur- and silicate-containing carbonaceous fuel is slurried with water, a liquid hydrocarbon fuel, liquid $CO_2$ or mixtures thereof.

4. A process according to claim 1, wherein said temperature moderator is selected from the group consisting of water and steam.

5. A process according to claim 1, where said oxygen-containing gas is selected from the group consisting of air, oxygen-enriched air, and oxygen gas.

6. A process according to claim 1, where said iron-containing compound portion of said sulfur capture additive is selected from the group consisting of iron oxides, iron carbonates, mill scale, iron ores, and mixtures thereof.

7. A process according to claim 1, where said iron-containing compound portion of said sulfur capture additive is present in a concentration of 0.1–15.0 weight percent, based on the weight of said carbonaceous fuel.

8. A process according to claim 7, where said iron-containing compound portion of said sulfur capture additive is present in a concentration of 4.0–8.0 weight percent, based on the weight of said carbonaceous fuel.

9. A process according to claim 1, where said sodium-containing compound portion of said sulfur capture additive is selected from the group consisting of sodium oxides, sodium carbonates, organic sodium-containing compounds, sodium silicates, sodium aluminum silicates, and mixtures thereof.

10. A process according to claim 1, where said sodium-containing compound portion of said sulfur capture additive is present in a concentration of 0.1–5.0 weight percent, based on the weight of said carbonaceous fuel.

11. A process according to claim 10, where said sodium-containing compound portion of said sulfur capture additive is present in a concentration of 1.0–3.0 weight percent, based on the weight of said carbonaceous fuel.

12. A process according to claim 1, where said sulfur capture additive additionally comprises less than 5.0 weight percent, based on the weight of said carbonaceous fuel, of a copper-containing compound portion selected from the group consisting of copper oxides, copper carbonates, copper-containing ores, and mixtures thereof.

13. A process according to claim 12, where said sulfur capture additive additionally comprises 0.5–2.0 weight percent of said copper-containing compound portion.

14. A process according to claim 1, in which said partial oxidation takes place at a temperature in the range of 1800°–2100° F.

15. A process for the partial oxidation of a sulfur- and silicate-containing carbonaceous fuel to produce a synthesis gas with reduced sulfur content which comprises partially oxidizing a sulfur- and silicate-containing carbonaceous fuel at a temperature in the range of 1800°–2200° F. in the presence of a temperature moderator, an oxygen-containing gas and a sulfur capture additive which comprises an iron-containing compound portion, a sodium-containing compound portion, and a copper-containing compound portion to produce a synthesis gas comprising $H_2$ and CO with a reduced sulfur content and a molten slag which comprises a sulfur-containing sodium-iron silicate phase and a sodium-copper-iron sulfide phase.

16. A process according to claim 5, where said sulfur- and silicate-containing carbonaceous fuel is selected from the group consisting of unwashed or washed coal, crude residue from petroleum distillation and cracking process operations, petroleum distillate, reduced crude, whole crude, asphalt coal, coal tar, coal derived oil, petroleum coke, shale oil, tar sand oil, and mixtures thereof.

17. A process according to claim 5, where said sulfur- and silicate-containing carbonaceous fuel is slurried with water, a liquid hydrocarbon fuel, liquid $CO_2$ or mixtures thereof.

18. A process according to claim 15, where said temperature moderator is selected from the group consisting of water and steam.

19. A process according to claim 15, where said oxygen-containing gas is selected from the group consisting of air, oxygen-enriched air, and oxygen gas.

20. A process according to claim 15, where said iron-containing compound portion of said sulfur capture additive is selected from the group consisting of iron oxides, iron carbonates, mill scale, iron ores, and mixtures thereof.

21. A process according to claim 15, where said iron-containing compound portion of said sulfur capture additive is present in a concentration of 0.1–15.0 weight percent, based on the weight of said carbonaceous fuel.

22. A process according to claim 21, where said iron-containing compound portion of said sulfur capture additive is present in a concentration of 4.0–8.0 weight percent, based on the weight of said carbonaceous fuel.

23. A process according to claim 15, where said sodium-containing compound portion of said sulfur capture additive is selected from the group consisting of sodium oxides, sodium carbonates, organic sodium-containing compounds, sodium silicates, sodium aluminum silicates, and mixtures thereof.

24. A process according to claim 15, where said sodium-containing compound portion of said sulfur capture additive is present in a concentration of 0.1–5.0 weight percent, based on the weight of said carbonaceous fuel.

25. A process according to claim 24, where said sodium-containing compound portion of said sulfur capture additive is present in a concentration of 1.0–3.0 weight percent, based on the weight of said carbonaceous fuel.

26. A process according to claim 15, where said copper-containing compound portion of said sulfur capture additive is selected from the group consisting of copper oxides, copper carbonates, copper-containing ores, and mixtures thereof.

27. A process according to claim 15, where said copper-containing compound portion of said sulfur capture additive is present in a concentration of less than 5.0 weight percent, based on the weight of said carbonaceous fuel.

28. A process according to claim 27, where said copper-containing compound portion of said sulfur capture additive is present in a concentration of 0.5–2.0 weight percent, based on the weight of said carbonaceous fuel.

29. A process according to claim 15, in which said partial oxidation takes place at a temperature in the range of 1800°–2100° F.

* * * * *